(12) United States Patent
Henry et al.

(10) Patent No.: US 8,989,278 B2
(45) Date of Patent: Mar. 24, 2015

(54) METHOD AND DEVICE FOR CODING A MULTI DIMENSIONAL DIGITAL SIGNAL COMPRISING ORIGINAL SAMPLES TO FORM CODED STREAM

(75) Inventors: Félix Henry, Rennes (FR); Christophe Gisquet, Rennes (FR); Isabelle Corouge, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 422 days.

(21) Appl. No.: 13/394,050

(22) PCT Filed: Sep. 9, 2010

(86) PCT No.: PCT/IB2010/054078
§ 371 (c)(1),
(2), (4) Date: Mar. 2, 2012

(87) PCT Pub. No.: WO2011/030304
PCT Pub. Date: Mar. 17, 2011

(65) Prior Publication Data
US 2012/0155749 A1    Jun. 21, 2012

(30) Foreign Application Priority Data
Sep. 9, 2009  (EP) .................................... 09305826

(51) Int. Cl.
*G06T 9/00*    (2006.01)
*H04N 19/635*    (2014.01)
(Continued)

(52) U.S. Cl.
CPC ............. *H04N 19/635* (2014.11); *H04N 19/46* (2014.11); *H04N 19/122* (2014.11); *H04N 19/11* (2014.11); *H04N 19/117* (2014.11)
USPC ..................................................... 375/240.24

(58) Field of Classification Search
CPC ................. H04N 19/00066; H04N 19/00084; H04N 19/00824; H04N 19/00042; H04N 19/00545; H04N 19/635; H04N 19/46; H04N 19/122; H04N 19/11; H04N 19/117
USPC ..................................................... 375/240.24
See application file for complete search history.

(56) References Cited

U.S. PATENT DOCUMENTS 5,978,517 A    11/1999    Henry et al. .................. 382/253
5,995,027 A    11/1999    Henry ............................. 341/50
(Continued)

FOREIGN PATENT DOCUMENTS

EP    1 571 849    9/2005
EP    1 845 729    10/2007
(Continued)

OTHER PUBLICATIONS

Chuo-Ling Chang, et al., "Direction-Adaptive Discrete Wavelet Transform for Image Compression", IEEE Transactions on Image Processing, vol. 16, No. 5, May 2007, pp. 1289-1302.
(Continued)

*Primary Examiner* — Richard Torrente
*Assistant Examiner* — Joseph Suh
(74) *Attorney, Agent, or Firm* — Fitzpatrick, Cella, Harper & Scinto

(57) ABSTRACT

The present invention relates to a method and a device for coding a multidimensional signal ($LL_0$) comprising samples to form a coded stream (FC), such as an image or a multimedia content. The method comprises: —filtering (E102) original samples by applying a first filter (F, G) to obtain filtered samples (L1) —coding (E172) said filtered samples to obtain coded filtered samples adapted to be decoded by a decoder into decoded filtered samples, —applying (E106) a lossy modification on the filtered samples to obtain modified samples ($L_{1dec}$); —determining (E110, E130, E150) a geometric orientation of one second filter (F', G') to be applied by the decoder to a decoded filtered sample, the determining being based on the modified samples, the original samples and a predetermined criterion, and —providing (E174) said determined geometric orientations and said coded filtered samples to the decoder.

16 Claims, 8 Drawing Sheets

(51) Int. Cl.
*H04N 19/46* (2014.01)
*H04N 19/122* (2014.01)
*H04N 19/11* (2014.01)
*H04N 19/117* (2014.01)

(56) References Cited

U.S. PATENT DOCUMENTS

| | | | |
|---|---|---|---|
| 6,215,422 B1 | 4/2001 | Henry et al. | 341/51 |
| 6,333,705 B1 | 12/2001 | Amonou et al. | 341/107 |
| 6,353,680 B1* | 3/2002 | Hazra et al. | 382/232 |
| 6,498,866 B2 | 12/2002 | Charrier et al. | 382/248 |
| 6,501,860 B1 | 12/2002 | Charrier et al. | 382/240 |
| 6,631,213 B1 | 10/2003 | Amonou et al. | 382/232 |
| 6,778,608 B1 | 8/2004 | Berthelot et al. | 375/240.18 |
| 6,801,666 B1 | 10/2004 | Henry et al. | 382/240 |
| 7,027,656 B2 | 4/2006 | Henry et al. | 382/239 |
| 7,088,858 B2 | 8/2006 | Henry | 382/173 |
| 7,315,648 B2 | 1/2008 | Henry | 382/173 |
| 7,460,722 B2 | 12/2008 | Henry | 382/239 |
| 7,463,782 B2 | 12/2008 | Fuchs et al. | 382/248 |
| 7,477,790 B2 | 1/2009 | Henry | 382/233 |
| 7,567,716 B2 | 7/2009 | Henry et al. | 382/232 |
| 7,657,108 B2 | 2/2010 | Fuchs et al. | 382/239 |
| 7,936,938 B2 | 5/2011 | Gisquet et al. | 382/246 |
| 8,023,561 B1* | 9/2011 | Garrido et al. | 375/240.15 |
| 2002/0021753 A1* | 2/2002 | Igi et al. | 375/240.01 |
| 2005/0196060 A1 | 9/2005 | Wang et al. | 382/240 |
| 2006/0280372 A1* | 12/2006 | Han | 382/240 |
| 2007/0116373 A1* | 5/2007 | Hwang et al. | 382/261 |
| 2008/0130736 A1 | 6/2008 | Onno et al. | 375/240.01 |
| 2008/0172434 A1* | 7/2008 | Henry | 708/308 |
| 2008/0226185 A1 | 9/2008 | Henry | 382/240 |
| 2009/0034608 A1 | 2/2009 | Gisquet | 375/240.01 |
| 2009/0041132 A1 | 2/2009 | Le Floch et al. | 375/240.26 |
| 2009/0210469 A1* | 8/2009 | Henry et al. | 708/308 |
| 2009/0245660 A1 | 10/2009 | Henry et al. | 382/224 |
| 2009/0254798 A1 | 10/2009 | Gisquet et al. | 714/819 |
| 2010/0014763 A1 | 1/2010 | Wittmann et al. | 382/233 |
| 2010/0054613 A1 | 3/2010 | Henry | 382/233 |
| 2012/0117133 A1 | 5/2012 | Henry et al. | 708/203 |

FOREIGN PATENT DOCUMENTS

| | | |
|---|---|---|
| EP | 1845729 A1 * | 10/2007 |
| FR | 2 927 744 | 8/2009 |
| FR | 2 927 745 | 8/2009 |
| WO | 2011/030304 | 3/2011 |
| WO | 2011/036653 | 3/2011 |

OTHER PUBLICATIONS

Hao Xu, et al., "Lifting-Based Directional DCT-Like Transform for Image Coding", IEEE Transactions on Circuits and Systems for Video Technology, vol. 17, No. 10, Oct. 2007, pp. 1325-1335.

Le Pennec, E., et al., "Sparse Geometric Image Representations With Bandelets", IEEE Transactions on Image Processing, vol. 14, No. 4, Apr. 2005, pp. 423-438.

Ling Shao, et al., "An Overview and Performance Evaluation of Classification-Based Least Squares Trained Filerters", IEEE Transactions on Image Processing, vol. 17, No. 10, Oct. 1, 2008, pp. 1772-1782.

Prieto, Y., et al., "Locally Adaptive Orientation Wiener Image Filter with Local Noise Estimate", Signals, Systems & Computers, 1997, Conference Record of the Thirty-First Asilomar Conference, vol. 1, Nov. 2, 1997, pp. 338-342.

Wenpeng Ding, et al., "Adaptive Directional Lifting-Based Wavelet Transform for Image Coding", IEEE Transactions on Image Processing, Vo. 16. No. 2, Feb. 2007, pp. 416-427.

U.S. Appl. No. 13/394,520, filed Mar. 6, 2012.

* cited by examiner

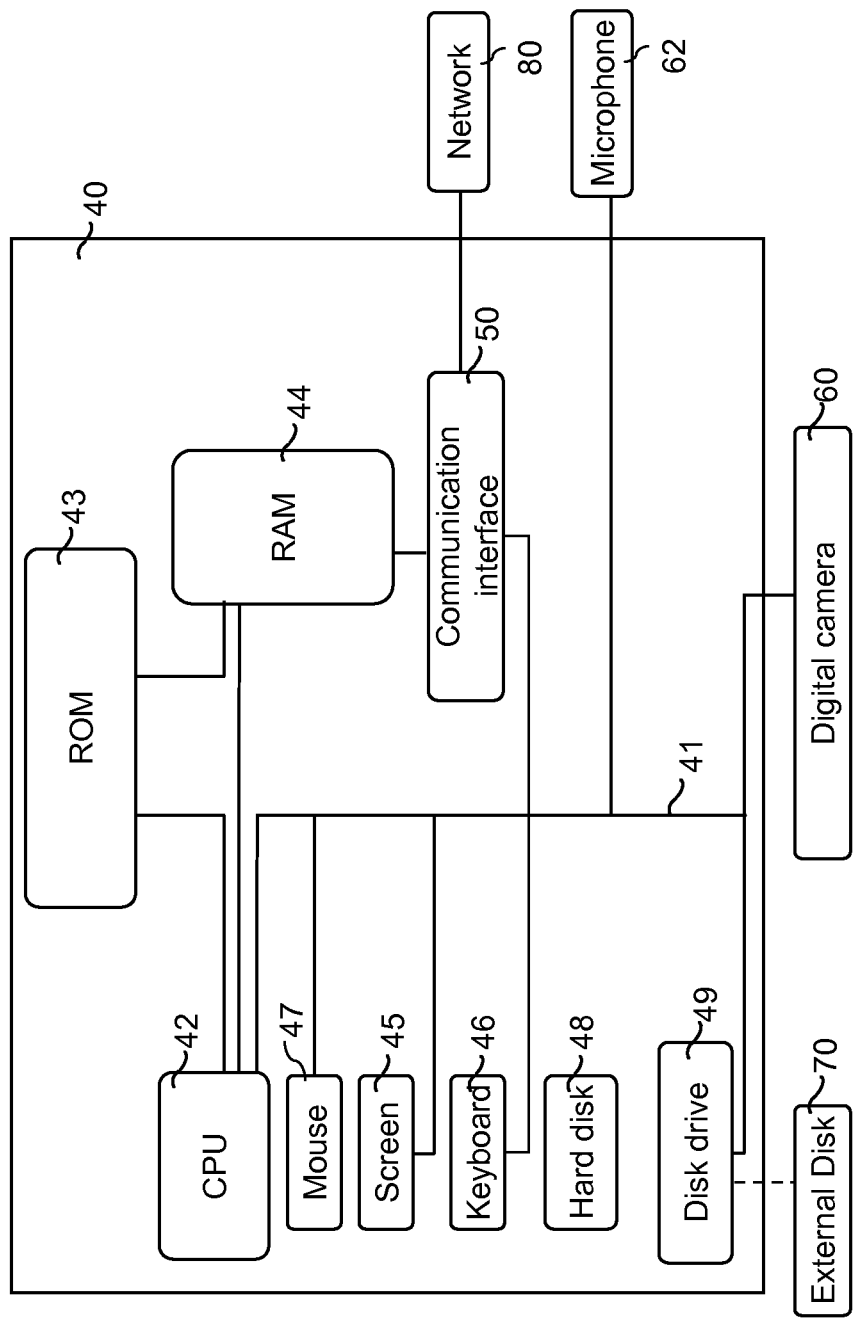

METHOD AND DEVICE FOR CODING A MULTI DIMENSIONAL DIGITAL SIGNAL COMPRISING ORIGINAL SAMPLES TO FORM CODED STREAM

The present invention relates to a method and a device for coding a multidimensional digital signal.

The present invention relates in general to the coding and decoding of multidimensional digital signals representing physical quantities. By way of non-limiting examples, the signals concerned may represent still images or videos or more generally multimedia data.

A particularly advantageous, but not exclusive, application of the present invention is coding/decoding of digital signals using directional filters.

In the case, for example, of a digital image coming from a digital camera, this is constituted by a set of N*M pixels, where N is the height of the image in pixels and M the width of the image. The image thus obtained is coded before being stored in a memory or transmitted to an addressee over a communication network. The initial data, in other words the information representing the image pixels, is organized into a two-dimensional array that can be accessed, for example, line by line.

A digital image is subjected to a transform prior to being coded, and in the same way, during the decoding of a coded digital image, the coded image is subjected to an inverse transform. The transform consists in applying one or several filters to all or part of a digital image.

A filter is a convolution product between the image signal and a predetermined vector that allows, for each pixel of the area to which it applies, its value to be modified according to the values of the neighboring pixels, with assigned coefficients.

The coding technique described in the patent document FR-A-2 889 382 makes it possible to filter the signal prior to compression, by orienting the filter along certain directions, for each pixel, with a view to reducing the dynamic range of the signal generated and thus to increase the compression of the signal.

This filtering uses a decomposition of the signal into frequency sub-bands, for example into four sub-bands for a bi-dimensional image:
- a sub-band LL (respectively HH) comprising the components of low (respectively high) frequency in both dimensions;
- a sub-band LH (respectively HL) comprising the components of low (respectively high) frequency in one dimension and of high (respectively low) frequency in the other.

It aims at reducing the quantity of information present in the sub-bands, so as to improve the compression of the signal with a view to storage or transmission thereof.

Each filtered sample has an amplitude value and an associated geometric orientation value. "Orientation" means here a direction in the image (for example row of pixels or column of pixels or diagonal of pixels).

A filtering operation is applied according to the orientation that will have been determined as the most appropriate, so as to increase the performance of the filtering.

Such a filtering method makes it possible to take account of local variations and in particular the local orientation of the flow of the digital signal whilst preserving the property of separability of the filtering. That is to say the filtering can be applied independently to the various dimensions of the digital signal processed, for example successively on each of its dimensions, such as, in the case of an image signal, along the rows and along the columns or vice versa.

To facilitate the inverse filtering (or de-filtering) operation performed on decoding, it is possible to associate, during the coding, with each filtered sample, an item of information representing the geometric orientation of the filter applied to this sample.

The filtering of samples can use a filtering scheme that is particularly advantageous for the present invention, called a "lifting scheme", with for example at least two filters, which may each be applied to different samples. This is economical in terms of memory space, given that the samples are replaced during their filtering.

The lifting scheme is a particular implementation of wavelet transformation that performs two successive filtering operations, a first high-pass filtering operation and a second low-pass filtering operation, each sample being replaced by the result of its filtering.

For example, the lifting scheme performs a first passage by filtering the samples having an even position. The selected samples are then filtered according to a high-pass filter which intercepts only the sample it filters and other samples of odd position, and are replaced by the filtering result. Next, the lifting scheme performs a second passage, filtering the samples having an odd position and intercepting only the sample it filters and other samples of even position. Finally, the filtered samples are coded by using a quantization and entropy encoding.

As for the decoding of a digital signal coded by such a technique, it comprises obtaining a plurality of decoded filtered samples by applying entropy decoding and then applying inverse filtering to the decoded filtered samples. The inverse filtering is performed on a decoded filtered sample according to the geometric orientation of the filter that was used for the filtering of the original sample during its coding.

However, the inventors have noticed that the geometric orientations that are most efficient for use by the decoder are not always the geometric orientations used when coding the samples. This is in particular the case when lossy processing, such as quantization and inverse quantization (or de-quantization), is further applied to the signal, significantly modifying the local features in the signal, before the decoder receives it.

It would consequently be advantageous to be able to carry out coding/decoding of low complexity, that improves the rendering of the signal with less distortion, while maintaining a good level of compression.

The present invention aims firstly at providing a method of coding a multidimensional digital signal comprising a plurality of original samples to form a coded stream, the method comprising a step of filtering original samples by applying at least one first filter to obtain filtered samples and a step of coding at least some of said filtered samples to obtain corresponding coded filtered samples adapted to be decoded by a decoder into decoded filtered samples, the method comprising the following steps:
  applying a lossy modification of the filtered samples to obtain modified samples;
  determining at least one geometric orientation of one second filter to be applied by the decoder to at least one decoded filtered sample, the determining being based on the modified samples, the original samples and a predetermined criterion, and
  providing said determined geometric orientations and said coded filtered samples to the decoder.

According to the present invention, the geometric orientations of the second filter used during operations when decoding, for example filtering for reconstruction of original samples, are determined during the coding of the signal at the coder. This is because, since the coder has knowledge of the original signal (and not the decoder), the geometric orientations may be determined so to improve the compression/distortion ratio of the coded signal.

The invention provides that losses, as for example the losses due to lossy coding, are taken into account during the coding to improve the subsequent rendering of the decoded signal.

The invention further provides that a simulation of the losses, in particular these due to lossy transmission for example, is performed during the coding so that the determination is efficiently conducted.

The determination is furthermore made independently of the geometric orientations used during the actual filtering and coding of the samples. A second filter for decoding that is different from the first filter may thus be chosen.

In addition, for the decoder, the processing operations are very simple since they rely on the use solely of the geometric orientations that have been chosen during the coding. No corresponding calculation has to be made by the decoder.

In one embodiment, the applying step comprises simulating the quantization of the filtered samples and the dequantization of the filtered samples quantized to obtain the modified samples. Therefore the modified samples are quantized/dequantized filtered samples, identical to the ones obtained at the decoder side if there is no further loss due to transmission or storage.

This provision particularly applies for sub-bands with high frequency details, such as LH, HL and HH sub-bands, but also with the final low frequency data sub-band LL. No coding and decoding processing, such as entropy coding/decoding, is conducted in this simulation, in order to make it faster. This is mainly because such coding/decoding processing is lossless and therefore does not modify the values. In this embodiment, the sole processing steps modifying the filtered samples between the coder and the decoder are those of the quantization/dequantization process.

In one embodiment, the applying step comprises decomposing the filtered samples into sub-bands, simulating the quantization and the dequantization of the filtered samples of all the sub-bands, and reconstructing said modified samples from the dequantized samples.

This provision applies for intermediate low frequency sub-bands LL because they are again filtered into lower level sub-bands. Again, thanks to this processing, the modified samples used for said determination are as close as possible to the samples that the decoder will obtain for decoding.

According to a particular feature, the step of coding the filtered samples comprises a step of actual quantizing the filtered samples, and the step of applying a lossy modification comprises simulating the dequantization of the actual quantized filtered samples.

In this case, the actual quantization and the simulated quantization are one and the same step. Performing only one quantization step provides a faster process using fewer resources.

In an embodiment of the invention, the modified samples are made of at least two sub-bands, each being transposed for determining the geometric orientations.

The transposition has the mathematical meaning, e.g. swapping columns for rows in an image.

This transposition makes it possible to use the same horizontal filtering unit for all filtering processes, thus saving hardware design costs at the decoder side.

In particular, the multidimensional digital signal before filtering is transposed for determining the geometric orientations.

More particularly, the at least two sub-bands of the modified samples are interleaved for said determining.

A simulated signal of the same dimension as the original signal before filtering is thus obtained. The comparison between these two signals when applying the second filter is therefore simplified, in order to evaluate said criterion, for example distortion of the signal.

In one embodiment, said determining comprises, for at least one modified sample, the following steps:
  simulating the filtering of the modified sample by applying the second filter thereto in a plurality of geometric orientations, the simulation resulting in a plurality of corresponding filtered modified samples;
  selecting one of said geometric orientations according to said predetermined criterion, the filtered modified samples and the original samples.

With this provision, the determination of the optimal orientation in the invention takes account of local variations in the decoded signal, so as to increase compression/distortion ratio and decoding performance.

In particular, the geometric orientation selected according to said predetermined criterion is the geometric orientation associated with the filtered modified sample that minimizes the distortion with respect to the original multidimensional signal.

A better rendering of the signal is therefore obtained at the decoder side, for the same compression efficiency.

Alternatively, the geometric orientation selected according to said predetermined criterion is the geometric orientation associated with the filtered modified sample that minimizes a linear combination of the distortion of the original multidimensional signal and the rate to code said determined geometric orientation.

This gives a higher compression/distortion ratio. A 4 dB gain in the rendered signal has been observed for the invention compared to the standard wavelet method, when the optimal orientation is chosen for each sample.

According to a particular feature, the method comprises the filtering of the modified samples, so as to obtain filtered modified samples corresponding to a multidimensional signal with higher resolution.

This may be used when the original signal is decomposed into several layers of sub-bands and the invention is iteratively applied to all the sub-bands. With the above provision, the determination of orientations for lower sub-bands is used for the calculation of the modified samples for a higher sub-band, in particular an LL sub-band. Additional calculations are thus avoided when determining the orientations for this higher sub-band.

In particular, said filtering of the modified samples comprises the retrieval, from the pluralities of filtered modified samples, of the filtered modified samples corresponding to the selected geometric orientations. Calculation for the filtering of the second set is thus avoided.

In another embodiment, said determining comprises the following steps:
  calculating the value of a context function for each modified sample, the context function taking account of a predetermined number of other modified samples;
  dividing the modified samples into sub-signals, each corresponding to the various values of the context function;
  associating a same geometric orientation of the second filter with the filtered samples corresponding to all the modified samples of a same sub-signal.

The context functions capture the local properties of the signal, and therefore associating a geometric orientation with a given context function value improves the compression of the digital signal. Moreover, it provides a compact way to describe the orientations.

In particular, the associated geometric orientation is the orientation among a plurality of orientations of the second filter that minimizes the distortion with respect to the original multidimensional signal.

In one embodiment, the method comprises the coding of information representing the determined geometric orientations to form part of the coded stream.

With this provision, the geometric orientations are received, at the decoder side, within the coded stream to enable faster decoding. If a context function is used, the information specifying the context function used and the corresponding orientation for each context function value is also specified in the stream.

In particular, the information representing a determined geometric orientation is associated, within the coded stream, with the corresponding filtered sample. This also facilitates the decoding operations.

In one embodiment, the at least one first filter is applied with the same orientation for the filtering of each original sample.

The actual coding of the multidimensional signal is thus simple and fast. It is clear here that the improvement of the invention relies on the determination of the geometric orientation of the second filter (to be used at the decoder for inverse filtering) during the coding, but independently of the actual coding of the signal.

In particular, the at least one first filter is not oriented. For example, the filter remains horizontal or vertical when filtering along the lines or the columns, as usually applied for example in the JPEG2000 coding standard.

Alternatively to the use of a same orientation for coding, the step of filtering an original sample comprises determining, according to at least one further predetermined criterion, a geometric orientation among a plurality of geometric orientations in the multidimensional digital signal, and filtering said original sample by applying the at least one first filter with the determined geometric orientation.

A better compression of the signal taking account of the local values of the signal at the encoder may then be efficiently combined with the determination of better suited geometric orientations for decoding, so as to provide an improved compression/distortion ratio of the signal.

According to a feature of the invention, the steps of filtering, determining and providing are iterated so as to decompose said digital signal into sub-bands.

The invention also concerns a device for coding a multidimensional digital signal comprising a plurality of original samples to form a coded stream, the device comprising a filtering means to filter original samples by applying at least one first filter to obtain filtered samples and a coding means to code at least some of said filtered samples to obtain corresponding coded filtered samples adapted to be decoded by a decoder into decoded filtered samples, the device further comprising:
  a modification means to apply a lossy modification of the filtered samples to obtain modified samples;
  a determination means to determine at least one geometric orientation of one second filter to be applied by the decoder to at least one decoded filtered sample, the determination being based on the modified samples, the original samples and a predetermined criterion, and
  a providing means to provide said determined geometric orientations and said coded filtered samples to the decoder.

Optionally, the device may comprise means relating to the features of the coding method set forth above.

The present invention also relates to an information storage means, that is readable by a computer system, comprising instructions for a computer program adapted to implement the method of coding in accordance with the invention when that program is loaded and executed by the computer system.

The present invention further relates to computer program readable by a microprocessor, comprising portions of software code adapted to implement the method of coding in accordance with the invention, when it is loaded and executed by the microprocessor.

The device, the computer program and the information storage means have characteristics and advantages that are analogous to the method they implement.

Additional advantages and features of the present invention will become apparent from the description that follows given by way of example only, with reference to the accompanying drawings, in which.

Figure 1:
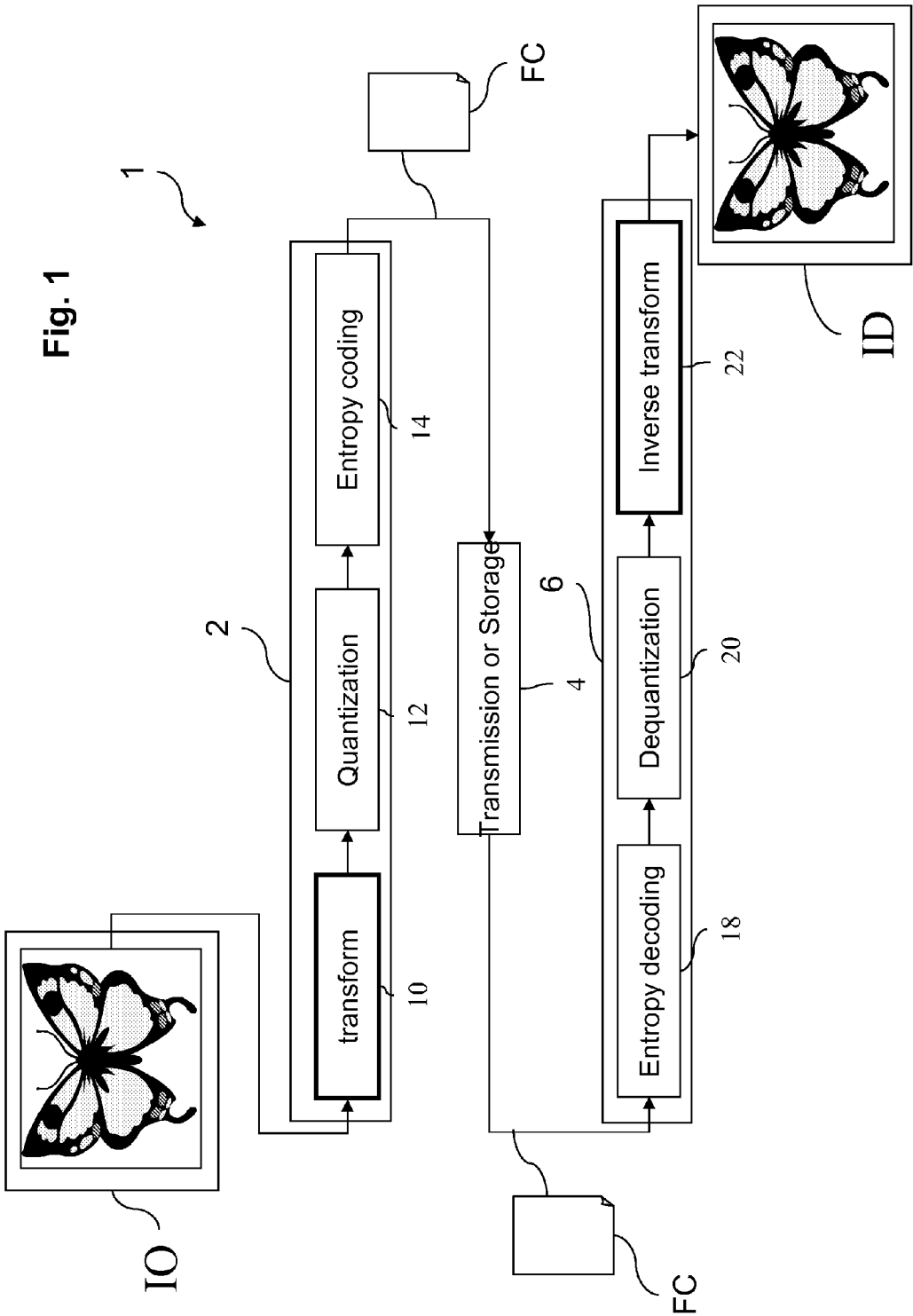
FIG. 1 is a simplified representation of a digital image processing system able to implement a coding/decoding mechanism according to an embodiment of the present invention.

FIG. 8 schematically depicts a particular hardware configuration of an information processing device adapted for an implementation of the method according to the embodiment of the invention;

With reference to the block diagram of FIG. 1, a system for processing digital images, in particular by coding and decoding according to the invention and designated by the general reference 1, implements a coding device 2, a transmission or storage unit 4 and a decoding device 6.

The invention finds a particularly advantageous application in a telecommunication system comprising a plurality of terminal devices connected through a telecommunication network. The coding method according to the invention can be implemented in terminal devices of the system so as to allow transmission of files over the telecommunication network and thus to reduce the traffic and transmission times.

Another particularly advantageous application consists in implementing the coding method according to the invention in a multimedia entity storage device, so as to be able to store a large quantity of data in a storage unit.

As shown in FIG. 1, the coding device 2 receives as an input an original image IO. The image IO is processed by the coding device 2, which delivers as an output a coded file containing compressed image data, designated by the reference sign FC.

The processing executed in the coding device 2 consists of performing transformation, quantization and entropy coding operations, respectively in the units 10, 12 and 14.

The transformation operation performed in the unit 10 is the one that implements the filtering of the invention, while the quantization and entropy coding operations respectively performed in the units 12 and 14 use conventional means.

It may be noted that the quantization of unit 12 is conventionally a lossy transformation which introduces quantization noise in the coded image.

The coded file FC is supplied to the transmission or storage unit 4 in order for example to be transmitted over a network or stored in a storage unit such as a CD, a DVD or a hard disk.

Similarly, the transmission over a network can be a lossy operation since transmission noise may impact the data of the file FC as received by the addressee.

In this respect, it is a goal of the present invention to enable decoding of the data by taking into account such losses resulting from any lossy modification of the signal that can be estimated at the coder.

The decoding device 6 receives as an input the coded file FC coming from the transmission or storage unit 4 and supplies as an output a reconstructed (or decompressed) image ID, which is substantially identical to the original image IO.

During decoding, the coded image is successively subjected to entropy decoding, dequantization and inverse transformation operations, respectively in the units 18, 20 and 22.

The inverse transformation operation performed in the unit 22 is the one that uses the results of the invention, while the entropy decoding and dequantization steps respectively performed in the units 18 and 20 use conventional means.

Generally, the initial data corresponding to the original image IO are organized in a bi-dimensional table that is accessible line by line.

The particular embodiment described below presents the coding and decoding of a still digital image, that is to say a bi-dimensional signal. The principle is however identical for a signal having a greater number of dimensions, for example, for a video, which is composed of three dimensions.

A description is now given of the coding, in accordance with the method of the invention, of a digital image, this coding comprising in particular a filtering phase consisting of decomposing the digital image signal into frequency sub-bands by applying a set of filters.

In a particular embodiment of the invention described in detail below, the filtering into sub-bands used is the wavelet decomposition as implemented in the JPEG2000 coding standard.

For more details on the JPEG2000 standard, reference can usefully be made to the following internet address: www.jpeg.org.

However, the present invention differs from the filtering as used in JPEG2000 since the filters used at the decoding side can be geometrically oriented, as described in the patent document FR-A-2 889 382.

As is well known, filtering into sub-bands consists in applying a filtering operation to an original signal in order to generate one or more sub-bands corresponding to different frequencies. These sub-bands taken together correspond to a given resolution.

It is then common to select one or more of these sub-bands in order to decompose them again into sub-bands, which will in their turn constitute the next resolution. This process may be iterated several times depending on the required lowest resolution.

The usual sub-band frequency transform, such as the wavelet transform based on a high-pass filter and a low-pass filter, produces four sub-bands of lower resolution from the original sub-band:
- a sub-band LL comprising the components of low frequency in a first and a second direction, generally the vertical and horizontal axis (which defines two dimensions of the image);
- a sub-band LH comprising the components of low frequency in a first direction and of high frequency in a second direction;
- a sub-band HL comprising the components of high frequency in a first direction and of low frequency in a second direction; and
- a sub-band HH comprising the components of high frequency in both directions.

By way of iterations, a sub-band of resolution $R_{i-1}$, noted sub-band $LL_{i-1}$, is decomposed into the sub-bands of lower resolution $R_i$, noted sub-bands $LL_i$, $LH_i$, $HL_i$ and $HH_i$.

In practice, the decomposition is generally achieved by first applying a horizontal filtering operation using the two filters (through the lifting scheme for example), and then subsampling the result by a factor of two along the horizontal dimension. This produces two sub-bands of intermediate resolution, respectively referred to as sub-bands $L_i$ and $H_i$, with respectively low and high frequencies along the horizontal axis, then having a low horizontal resolution and an unchanged high vertical resolution.

The further decomposition of sub-band $L_i$ (respectively $H_i$) by applying a vertical filtering operation provides the $LL_i$ and $LH_i$ sub-bands (respectively $HL_i$ and $HH_i$).

According to an alternative, the vertical and horizontal dimensions may be swapped in the process such that the vertical dimension is filtered first, in other words the columns of the digital image are processed, then the horizontal dimension, in other words the lines of the digital image are processed.

Figure 2:
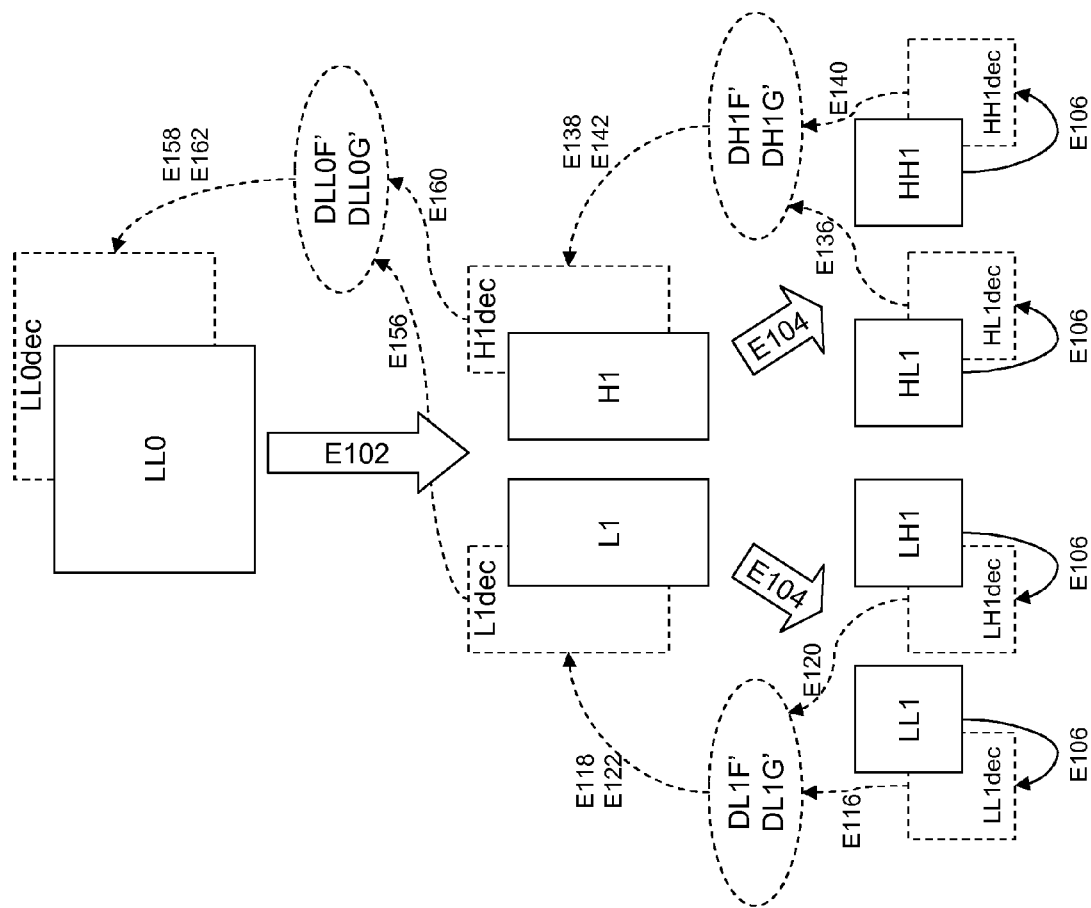
FIG. 2 illustrates the relationships between various sub-bands and corresponding information of geometric orientations according to the embodiment of the invention.

An embodiment of the invention will now be described with reference to a single iteration, i.e. the decomposition of a sub-band into a plurality of sub-bands, although the invention may be applied to several iterations. The description will focus on the decomposition of a sub-band, referred to as the $LL_0$ sub-band for ease of explanation, into sub-bands $LL_1$, $LH_1$, $HL_1$ and $HH_1$, as shown in FIG. 2.

Figure 3:
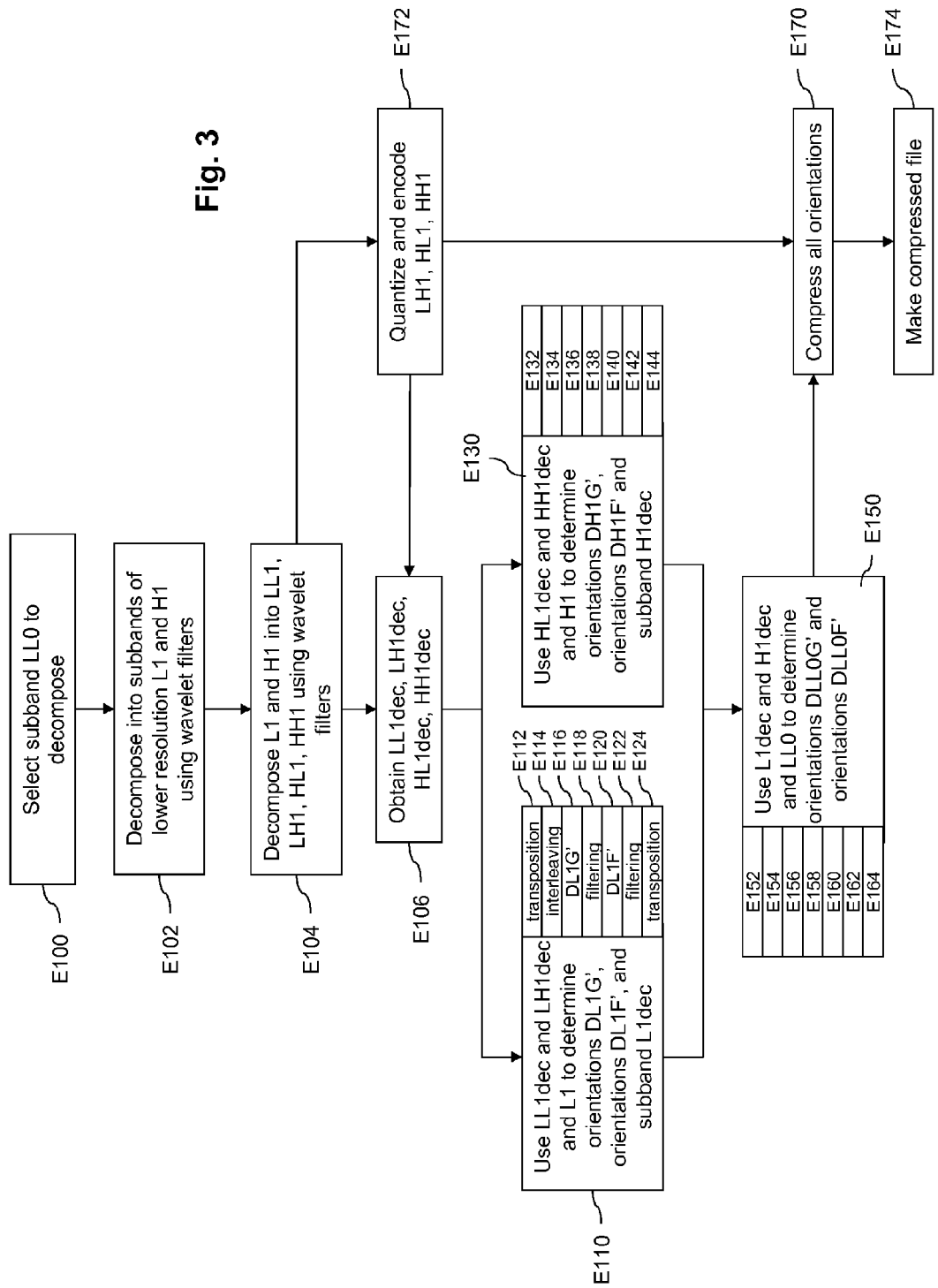
FIG. 3 shows an algorithm for encoding a digital image according to the embodiment of the invention.

FIG. 3 shows an algorithm for encoding a digital image according to the invention.

The algorithm starts at step E100 where the multidimensional digital signal of original samples to decompose is selected. For the first iteration, the original image IO is selected. However, selection may be made of any of the sub-bands resulting from a previous iteration.

The selected sub-band $LL_0$ defines the original resolution for the iteration.

The following steps E102 and E104 decompose the sub-band $LL_0$ into the four sub-bands $LL_1$, $LH_1$, $HL_1$ and $HH_1$, using the conventional mechanisms of filtering as explained above.

For example, the standard wavelet transform may be used. For illustration purposes here, steps E102 and E104 implement the lifting scheme approach for the wavelet transform.

However, the convolution method for the wavelet transform may be alternatively used.

In particular, at step E102, the sub-band $LL_0$ is decomposed into the intermediate resolution $L_1$ and $H_1$ sub-bands by applying a horizontal filtering operation.

Figure 4:
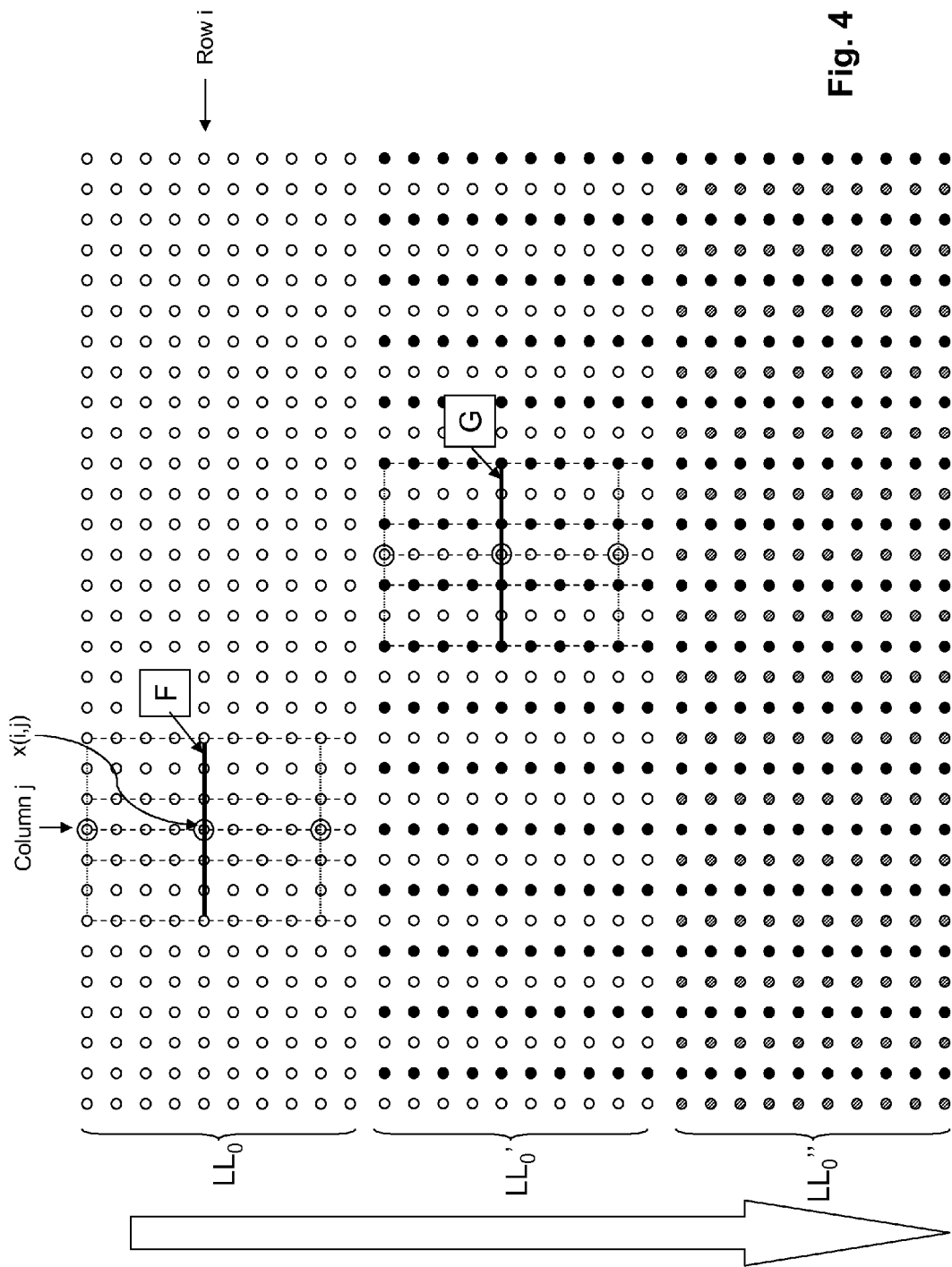
FIG. 4 illustrates, according to one example, the decomposition of sub-bands using a lifting scheme with filters during the encoding of FIG. 3.

With reference to FIG. 4, the lifting scheme for the wavelet transform consists in first applying a high-pass filter F to the column of a given parity, for instance the odd columns. A set S1 of filtered samples is thus obtained.

For the calculation, the filter particularly uses the coefficients (or samples) of the other parity (here even columns), but not the samples of the same parity except the sample to filter.

The sample in the course of high-pass filtering is the $j^{th}$ coefficient of the line, assuming that the column 0 is the furthest to the left in the image. This sample is denoted x(i,j).

As an example, when a conventional wavelet transformation is applied, a filter is applied to the coefficient vector [x(i,j−3),x(i,j−1),x(i,j),x(i,j+1),x(i,j+3)]. This is illustrated by the segment in FIG. 4.

When all the original samples of the sub-band $LL_0$ have been filtered, they are replaced in memory by the corresponding filtered values. Thus, by applying the high-pass filtering, the image $LL_0'$ of FIG. 4 is obtained.

$LL_0'$ contains the original coefficients at even column locations and the computed coefficients of the high frequency sub-band $H_1$ of intermediate resolution (i.e. filtered samples) at odd column locations, represented with black dots on the Figure.

The lifting scheme continues by applying a low-pass filter G to the columns of the other parity (here even columns). Similarly, the filter does not use the samples of the even columns except the sample to filter, and when all the samples have been low-pass filtered, they are replaced in the memory by the filtered values.

Thus, by applying the low-pass filtering to image $LL_0'$, the image $LL_0''$ of FIG. 4 is obtained.

$LL_0''$ contains the coefficients of the low frequency sub-band $L_1$ at even column locations (cross-hatched dots on the figure) and the coefficients of the high frequency sub-band $H_1$ of intermediate resolution at odd column locations (black dots on the Figure).

Step E102 further comprises the de-interleaving of the two sub-bands $L_1$ and $H_1$ contained within $LL_0''$, by respectively selecting the even and the odd columns. These two sub-bands are stored in memory for future use as explained later.

At step E104, these two sub-bands are each decomposed: $L_1$ into $LL_1$ and $LH_1$ sub-bands, and $H_1$ into $HL_1$ and $HH_1$ sub-bands, using the same process but by applying a vertical filtering operation and not a horizontal filtering operation like at step E102.

At the end of step E104, the encoder 2 has the four sub-bands $LL_1$, $LH_1$, $HL_1$ and $HH_1$, as shown in FIG. 2.

Alternatively to a non-oriented filtering operation, i.e. vertical and horizontal filtering, an oriented transform may be used, such as the mechanisms disclosed in FR-A-2 889 382. In this case, the geometric orientations used during the filtering are not saved in memory since, as explained later, the invention provides an independent geometric orientation for the decoding.

Conventional filters, such as the 9/7 filter used in JPEG2000 standard, may be used due to the use of the lifting scheme, in both embodiments.

The algorithm continues at step E106 where a calculation of a decoded version of the four lower-resolution sub-bands is performed by simulating all the modifications applied to the data to obtain the decoded version, for example a quantization and a dequantization. Thanks to the decoded version of the sub-bands, the encoder takes into account the losses due to encoding, in particular the quantization, when determining geometric orientations for decoding according to the teachings of the invention.

Alternatively or in addition, this step could simulate any other lossy modification which occurs between the first filtering and the expected inverse filtering of the data at the decoder side, such as the transmission on a noisy channel.

In the description below, the quantization losses are taken into account.

Sub-band $LL_1$ represents the coefficients of low frequency (filtered samples) and may be decomposed into another set of sub-bands as explained above.

If sub-band $LL_1$ is not further decomposed into sub-bands, it is processed like the other sub-bands $LH_1$, $HL_1$ and $HH_1$ by simulating their actual coding: quantization, entropy coding, entropy decoding and then de-quantization, to obtain modified samples.

Since entropy coding/decoding does not affect the content of the sub-bands, the lossy modification process of step E106 is preferably limited to the simulation of the quantization and the subsequent de-quantization of the coefficients of each sub-band. The simulation of quantization and de-quantization consists in simulating the effects of such lossy operations on the coefficients. The quantization (or de-quantization) can be scalar quantization as well as vectorial quantization, or any type of quantization.

Alternatively, more complex coding and decoding lossy algorithms, may be simulated instead of solely the quantization and de-quantization. As an example, the JPEG2000's EBCOT coding and decoding engine may be used.

A set of modified samples is thus obtained, namely, in the present example, the simulated decoded sub-bands $LL_{1dec}$, $LH_{1dec}$, $HL_{1dec}$ and $HH_{1dec}$. These sub-bands contain decoded filtered samples that should be inverse transformed (i.e. inverse filtered) at the decoder to obtain de-filtered samples.

On the other hand, if sub-band $LL_1$ is further decomposed into a number of sub-bands $LL_2$, $LH_2$, $HL_2$, $HH_2$, etc. of even lower resolution, the following processing steps are performed to obtain the simulated decoded sub-band $LL_{1dec}$:

decomposing the sub-band $LL_1$ into said number of sub-bands of even lower resolution;

quantizing all the sub-bands of even lower resolution;

optionally entropy encoding and decoding the quantized sub-bands;

de-quantizing all the decoded sub-bands of even lower resolution; and reconstructing a sub-band $LL_{1dec}$ based on the de-quantized sub-bands of even lower resolution.

This may apply iteratively to sub-band $LL_i$ until the sub-band with the lowest resolution is reached.

Alternatively, sub-band $LL_{1dec}$ may be obtained from other iterations of the steps of FIG. 3, in particular from the iteration involving the sub-bands $LL_2$, $LH_2$, $HL_2$, $HH_2$ of even lower resolution as explained later in the present iteration for obtaining $LL_{0dec}$.

The steps to obtain the other simulated decoded sub-bands $LH_{1dec}$, $HL_{1dec}$ and $HH_{1dec}$ are similar to the process when the sub-band $LL_1$ is not further decomposed. Modified samples are then obtained.

At the end of step E106, the sub-bands $LL_{1dec}$, $LH_{1dec}$, $HL_{1dec}$ and $HH_{1dec}$ are obtained, which comprise the same decoded filtered values that the decoder would obtain after entropy decoding and de-quantization.

The following steps, E110 and E130, are particular to the present invention in that they provide the calculation of a geometric orientation for the inverse filters of the decoder. It is remarkable in that this calculation for the decoder is performed during the encoding steps.

In the embodiment of FIG. 3, the inverse filters to be applied at the decoder or second filters are taken as the inverse filters of the first filters applied at the encoder. However, the second filters may have different filter coefficients and spatial support compared to the first filters. For example, if the first filter is the 9/7 filter used in the JPEG2000 standard, the second filter may be the 5/3 inverse filter.

Steps E110 and E130 may be performed successively in any order, or in parallel.

Step E110 aims at determining the geometric orientations of the inverse filters that the decoder will use when decoding the sub-bands $LL_{1dec}$ and $LH_{1dec}$ to reconstruct $L_{1dec}$ intermediate sub-band. The determination is based on sub-bands $LL_{1dec}$, $LH_{1dec}$, $L_1$ and a predetermined criterion.

At step E112, a first optional operation is performed on sub-bands $LL_{1dec}$, $LH_{1dec}$ by transposing them (according to the matrix transposition meaning, i.e. by swapping lines and columns of the sub-bands). The transposition is noted "$^t$". This allows the use of the same horizontal filtering unit for all filtering processes, thus saving on hardware design costs.

In this case, a similar transposition of $L_1$ is made to obtain $L_1^t$.

Figure 5:
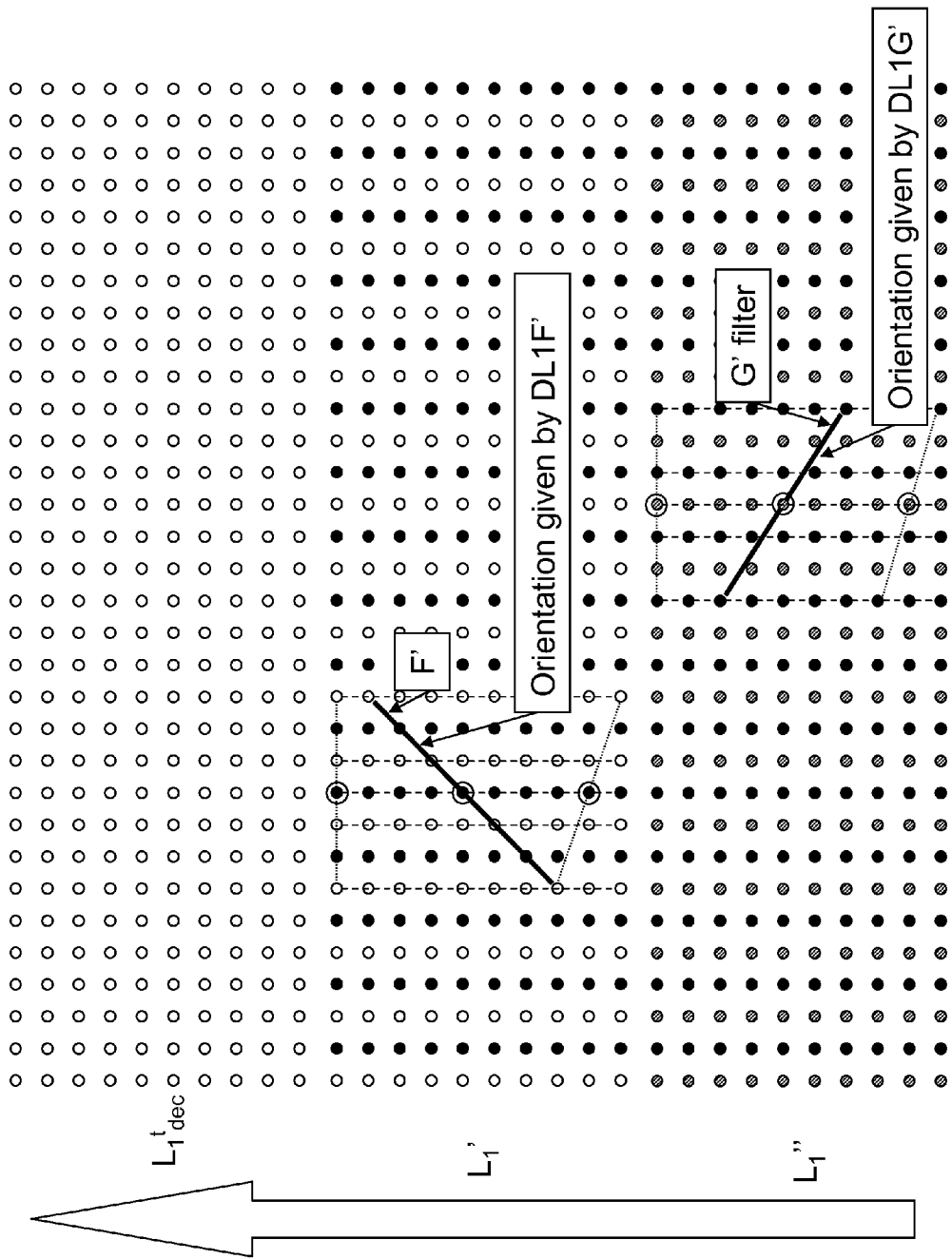
FIG. 5 illustrates, according to one example, the recombination of sub-bands using a lifting scheme with filters during the encoding of FIG. 3 and also during the decoding of a signal encoded according to the embodiment of the invention.

At step E114, the signals $LL_{1dec}^t$ and $LH_{1dec}^t$ are interleaved (inverse operation to the de-interleaving of step E102) to obtain the $L_1$" signal shown in FIG. 5. The black dots of the odd columns represent sub-band $LH_{1dec}$ and the cross-hatched dots of the even columns represent sub-band $LL_{1dec}$.

At step E116, the geometric orientations of the filter G' (inverse filter to G) for each of the values of the $L_1$" signal are determined as explained below. These determined orientations are referred to as $DL_{1G'}$.

The $L_1$" signal is first filtered with filter G' which is the inverse lifting filter to G. In practice, this is the same filter as G but with all coefficients except the central one multiplied by −1.

Figure 6:
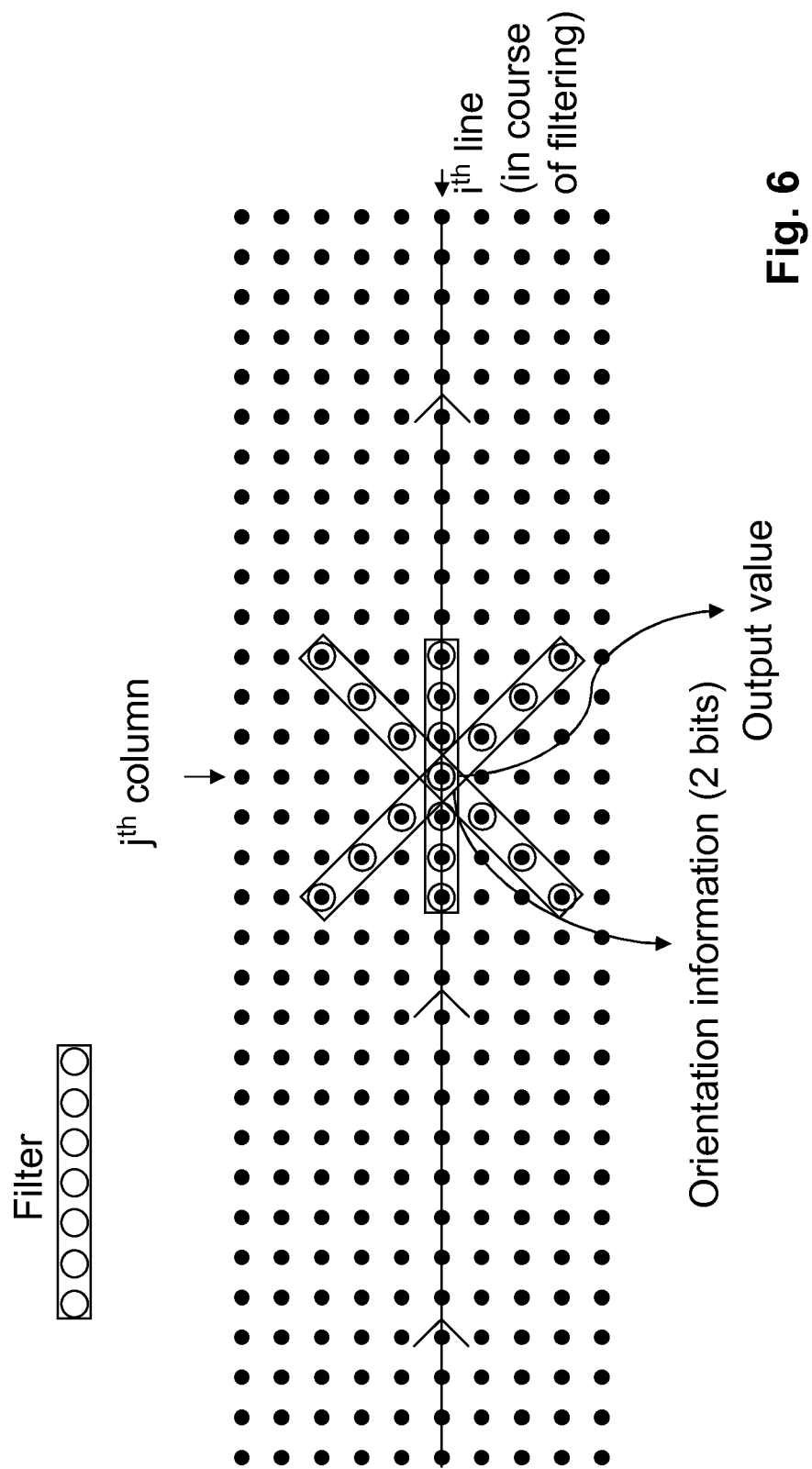
FIG. 6 shows, according to one example, the filtering simulation according to three possible geometric orientations.

According to the invention, the filter G' may be oriented along a plurality of geometric orientations in the $L_1$" signal, for example along three orientations as shown in FIG. 6. Each orientation is associated with an orientation value, for instance a two-bit value representing the values 0 to 2.

Practically, for each coefficient $x(i,j)$ of an odd column of $L_1$", the de-filtered value is calculated for each of the predetermined geometric orientations by applying filter G' along the corresponding orientations.

A new set S2 of de-filtered samples is thus obtained, containing, in our example, three values for a same original sample.

A selection of the most appropriate orientation from among the three possible orientations for the coefficient $x(i,j)$ is therefore made based on a predetermined criterion, the computed values for the coefficient $x(i,j)$ and the original sample at the corresponding position $(i,j)$ in the sub-band $L_1^t$.

According to an exemplary criterion, the distortion between the computed de-filtered value and the original sample is estimated, and the geometric orientation that minimizes the distortion is selected.

According to another criterion, a linear combination of such a distortion with the rate used to encode the orientation may be considered.

This results in the selection of one orientation value per coefficient of signal $L_1$" to filter. The orientation values are stored in memory in the data structure $DL_{1G'}$.

According to another approach, a context function is used to segment the signal $L_1$" (or any portion thereof) into different sub-signals.

A context function applied to a coefficient $x(i,j)$ calculates a value which depends on the coefficients surrounding said coefficient. For example, the context function examines the values of the low-frequency sub-band of resolution immediately lower than that of the sub-band currently being filtered, at the positions surrounding the sample of coordinates $(i/2, j/2)$. In general terms, the coordinates $(i/2, j/2)$ are taken to be equal to the integer part below the real value of $(i/2, j/2)$.

The context function can take only a limited number of values, for example three values. These values are called context values.

By calculating the context function for each sample of $L_1$", several (three) groups of samples, called sub-signals, are formed corresponding respectively to the (three) context values.

An orientation is then associated with each sub-signal. For determining this geometric orientation, the same criteria as above may be used, by applying the same orientation for all the coefficients of the sub-signals.

In this non-limiting example, the result is that only three geometric orientation values (which may be the same) are saved in the $DL_{1G'}$, one for each sub-signal. Memory is then saved for the storage of $DL_{G'}$.

In a more complex embodiment, several context functions are available. A choice of a context function is first made based for example on the function that has the lowest coding cost. This results in an orientation value being saved for each context value for each chosen context function.

The $DL_{1G'}$ structure then contains the identification of the context function and the orientation values associated with each of the sub-signals. The context values may be re-calculated at the decoder side using the identification of the context function and the coefficients of the low-frequency sub-band of resolution immediately lower.

At the end of step E116, the geometric orientations of the inverse filter G' to be applied by the decoder to each decoded filtered coefficient from the coded signal FC are known in the $DL_{1G'}$ structure.

Step E116 is followed by step E118 during which the signal $L_1$" is filtered along the even columns using filter G' and the determined orientations of $DL_{1G'}$. Practically, for a given coefficient $x(i,j)$ of $L_1$" of an even column, the filter G' is oriented according to the geometric orientation set in the $DL_{1G'}$ structure for the corresponding position $(i,j)$.

Another new set S3 of de-filtered samples is obtained.

To save processing time, the de-filtered values computed at step E116 may have been stored temporarily in buffer memory. In this case, step E118 may consist in retrieving the de-filtered value corresponding to the stored orientation. Buffer memory can then be erased.

Step E118 thus provides the signal $L_1'$ as shown in FIG. 5.

The process continues at step E120 where the geometric orientations of the filter F' (inverse filter to F) for each of the values of the $L_1'$ signal are determined. These determined orientations are referred to as $DL_{1F'}$.

This step is similar to step E116 except that the inverse filtering is performed on signal $L_1'$ obtained at step E118 (and not $L_1$"), by applying the filter F' (and not G') which is the inverse filter to F. This means that it is the same filter as F but all the coefficients except the central one are multiplied by −1.

The filtering is conducted on the coefficients of the odd columns of $L_1'$, in order to obtain the geometric orientations in the structure $DL_{1F'}$.

At step E122, and similarly to step E118, the signal $L_1'$ is filtered along the odd columns using filter F' oriented according the determined orientations of $DL_{1F'}$.

The result of this step is the obtaining of the sub-band $L_{1dec}^t$ as shown in FIG. 5.

This reconstructed sub-band can be expected to substantially correspond to sub-band $L_1^t$ except that the (de)quantization and (de)coding are lossy operations and have added distortion in the image. Thanks to the present invention, this distortion is reduced compared to the known prior art, for similar compression efficiency.

At step E124, the sub-band $L_1{}^t{}_{dec}$ is transposed in order to recover sub-band $L_{1dec}$.

FIG. 2 shows the relationship between the various sub-bands and the structures $DL_{1F'}$ and $DL_{1G''}$.

Step E130 is similar to step E110 except that it uses the sub-bands $HL_{1dec}$, $HH_{1dec}$, and $H_1$ to determine the geometric orientations of the inverse filters and produce the structures $DH_{1F'}$ and $DH_{1G''}$.

The steps E132-E144 are similar to steps E112-E124.

The end of step E144 also provides sub-band $H_{1dec}$.

The steps E110 and E130 are followed by step E150 which is similar to these steps except that it uses the sub-bands $L_{1dec}$, $H_{1dec}$, obtained at steps E124 and E144, and sub-band $LL_0$ to determine the geometric orientations of the inverse filters and produce the structures $DLL_{0F'}$ and $DLL_{0G''}$.

The steps E152-E164 are similar to steps E112-E124.

The end of step E164 also provides sub-band $LL_{0dec}$. This sub-band can be reused in a following iteration of the process of FIG. 3, if $LL_{0dec}$ does not correspond to the full resolution of the original signal, for example when determining $LL_{1dec}$ in step E106.

However, $LL_{0dec}$ may not be useful, for example when the iteration is performed on the sub-bands immediately under the original full resolution image. In this case, the steps E162 and E164 may be avoided to accelerate the process.

Following step E150, all the orientations are compressed at step E170.

In practice, the structures $DL_{1F'}$, $DL_{1G''}$, $DH_{1F'}$, $DH_{1G''}$, $DLL_{0F'}$ and $DLL_{0G'}$ are encoded. For this purpose, it is possible to use a single lossless compression such as Huffman coding or arithmetic coding.

In an embodiment, step E172 of quantizing and encoding the sets S3 of de-filtered samples is performed before step E106 to obtain coded filtered samples of the encoded file FC. In step E172 the sub-bands $LH_1$, $HL_1$ and $HH_1$ and possibly $LL_1$ if the latter is not further decomposed into sub-bands of lower resolution are actually encoded.

In this case, to make the encoding of the invention faster during above step E106, only the de-quantization (and possibly the entropy decoding) is simulated by using the quantized values obtained at this step E172, as represented by the horizontal arrow from box E172 in FIG. 3. The calculation for simulating the quantization is then avoided and processing time is saved.

Alternatively, step E172 could be performed at any time after step E104.

The actual coding comprises conventionally quantizing the coefficients of the sub-bands and then entropy coding them, using for example Huffman coding.

At step E174, the coded orientations and sub-bands resulting from steps E170 and E172 are grouped in a same compressed file FC that is subsequently transmitted to the decoder 6.

Alternatively, the coded orientations and sub-bands may be transmitted separately to the decoder.

FIG. 2 shows the relationship between the various sub-bands and the structures of orientation information.

Figure 7:
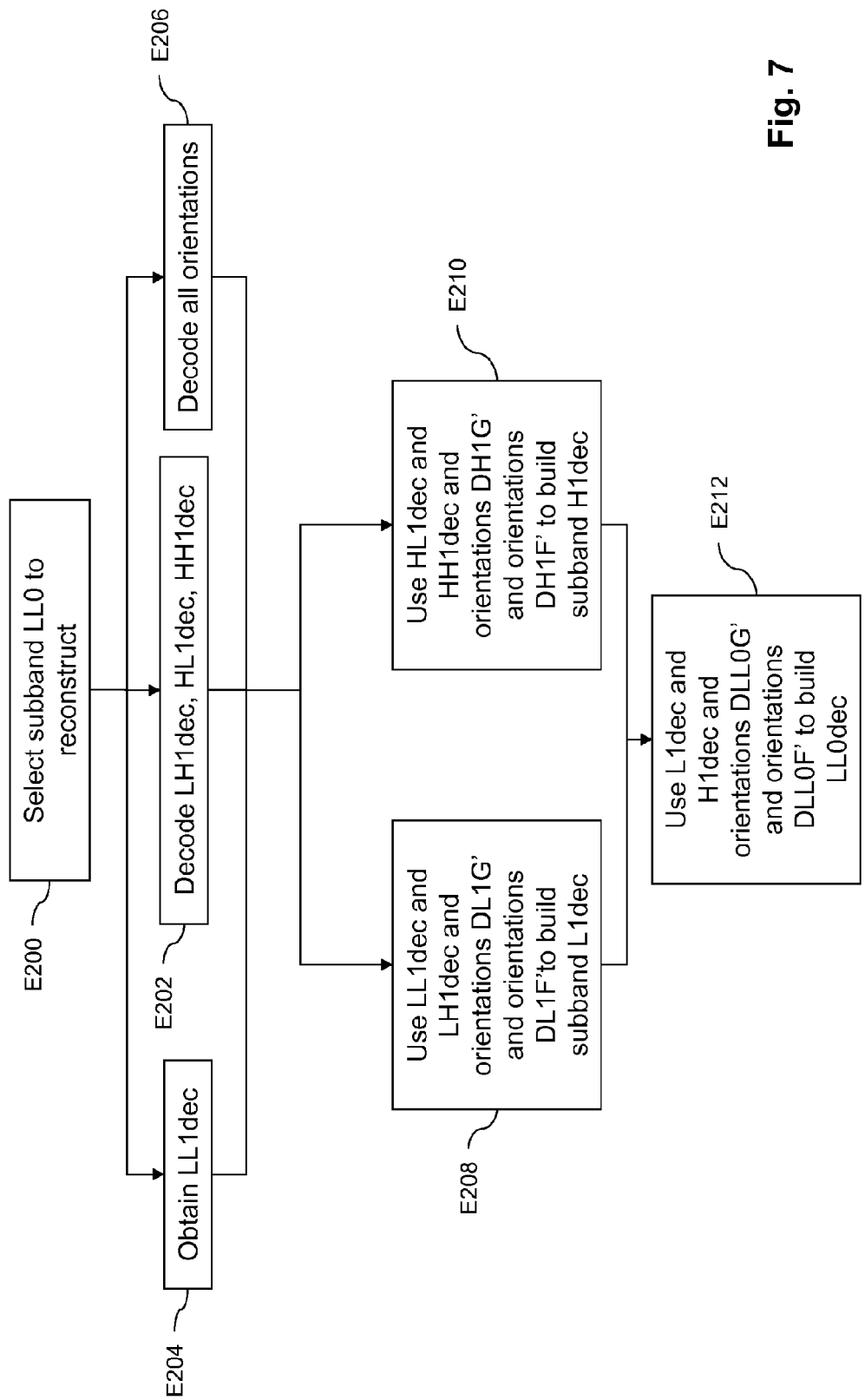
FIG. 7 shows the decoding, dequantizing and inverse filtering algorithm applied to an encoded sub-band.

The main steps of the decoding of the bit stream or encoded file FC constituting a sub-band are now described in relation to the flow diagram in FIG. 7.

A first step E200 consists in selecting the sub-band to decode, i.e. to reconstruct from sub-bands of lower resolution of the coded file FC.

At step E202, the coded sub-bands corresponding to $LH_1$, $HL_1$ and $HH_1$ obtained from the coded file FC are decoded using conventional means such as inverse quantization (de-quantization) and inverse entropy coding. The sub-bands $LH_{1dec}$, $HL_{1dec}$ and $HH_{1dec}$ of decoded filtered samples are thus obtained.

At step E204, the coded sub-band corresponding to $LL_1$ obtained from the coded file FC is decoded. Similarly to step E106, two cases are faced.

If this sub-band is not further decomposed into sub-bands of lower resolution during encoding, then the sub-band $LL_{1dec}$ is decoded using conventional means as at step E202.

If the sub-band is further decomposed into sub-bands of lower resolution during encoding, there is a need for additional steps consisting of decoding sub-bands of lower resolution and recombining them together to obtain $LL_{1dec}$. The decoding method for the invention or conventional means may be used for recombining the sub-bands of lower resolution.

At step E206, the geometric orientations are decoded in order to recover the data structures $DL_{1F'}$, $DL_{1G''}$, $DH_{1F'}$, $DH_{1G''}$, $DLL_{0F'}$ and $DLL_{0G''}$.

Since the encoding of step E170 is merely conventional, the decoding is also achieved using conventional means, such as entropy decoding.

Where context functions are used, this step may involve decoding the context function(s) and the orientations associated with each context value.

The context functions are then applied at the decoder to obtain the sub-signals corresponding to a given value of the context functions and the orientations retrieved from the data structure of orientations are applied accordingly.

As shown in FIG. 7, the steps E202-E206 may be performed in parallel. Alternatively, they may be successive steps in any order.

These steps are followed by steps E208 and E210 consisting in the recombination of sub-bands to obtain respectively sub-bands $L_{1dec}$ and $H_{1dec}$.

At step E208, the sub-bands $LL_{1dec}$ and $LH_{1dec}$ are known from steps E202 and E204, as well as the orientation structures $DL_{1F'}$ and $DL_{1G'}$ decoded at step E206.

A similar decoding process to the decoding algorithm disclosed in FR-A-2 889 382 can be used since the orientations for the decoding are known from $DL_{1F'}$ and $DL_{1G''}$.

This merely corresponds to the processing of step E110: transposition (E112) of $LL_{1dec}$ and $LH_{1dec}$, interleaving (E114) to obtain $L_1''$, filtering (E118) using $DL_{1G'}$, filtering (E122) using $DL_{1F'}$, and transposition (E124) to recover sub-band $L_{1dec}$.

Step E210 is similar to step E208, except that it uses the sub-bands $HL_{1dec}$ and $HH_{1dec}$, and the orientation structures $DH_{1F'}$ and $DH_{1G''}$.

Step E210 produces sub-band $H_{1dec}$.

Following steps E208 and E210, step E212 is also similar to these steps, except that it uses the sub-bands $L_{1dec}$ and $H_{1dec}$ from the steps E208 and E210, and the orientation structures $DLL_{0F'}$ and $DLL_{0G'}$ decoded at step E206.

Step E212 produces sub-band $LL_{0dec}$.

This may correspond to the decoded image. In such a case the process ends.

Another iteration may also be performed using this decoded sub-band $LL_{0dec}$ in order to decode a higher resolution sub-band.

As shown above, the filter orientations for the decoding are determined during the coding of the image. This enables fast decoding, since at the decoding stage, the orientations are pre-determined.

Furthermore, this pre-determination takes into account the decoded image (using simulation) and the original image. It results in optimization of the choice of the orientations for the decoding to minimize the distortion of the coding/decoding.

The invention is particularly efficient since it may be used with any filter, in particular the best Rate/Distortion filters such as 9/7.

Moreover, the invention is compatible with conventional decoding such as JPEG2000, provided that the information on geometric orientations is stored in metadata.

With reference to FIG. 8, a description is now given by way of example of a particular hardware configuration of an information processing device adapted for an implementation of the method according to the invention.

An information processing device implementing the present invention is for example a micro-computer 40, a workstation, a personal assistant, or a mobile telephone connected to different peripherals. According to still another embodiment of the invention, the information processing device takes the form of a camera provided with a communication interface to enable connection to a network.

The peripherals connected to the information processing device comprise for example a digital camera 60, or a scanner or a camcorder or any other means of image acquisition or storage, connected to an input/output graphics card (not shown) and supplying multimedia data to the information processing device.

The peripherals may also comprise a microphone 62 by means of an input/output card (not shown). The device 40 comprises a communication bus 41 to which there are connected:

- A central processing unit CPU 42 taking for example the form of a microprocessor;
- A read only memory 43 in which may be contained the programs whose execution enables the implementation of the method according to the invention;
- A random access memory 44, which, after powering up of the device 40, contains the executable code of the programs of the invention as well as registers adapted to record variables and parameters necessary for the implementation of the invention;
- A screen 45 for displaying data and/or serving as a graphical interface with the user, who may thus interact with the programs according to the invention, using a keyboard 46 or any other means such as a pointing device, for example a mouse 47 or an optical stylus;
- A hard disk 48 or a storage memory, such as a compact flash type card, able to contain the programs of the invention as well as data used or produced on implementation of the invention;
- An optional disk drive 49, or another reader for a removable data carrier, adapted to receive an external disk 70 and to read/write thereon data processed or to process in accordance with the invention; and
- A communication interface 50 connected to the telecommunications network 80, the interface 50 being adapted to transmit and receive digital data.

The communication bus 41 permits communication and interoperability between the different elements included in the device 40 or connected to it. The representation of the bus 41 is non-limiting and, in particular, the central processing unit 42 unit may communicate instructions to any element of the device 40 directly or by means of another element of the device 40.

The external disks 70 can be any information carrier such as a compact disc (CD-ROM) rewritable or not, a ZIP disk or a memory card. Generally, an information storage means, which can be read by a micro-computer or microprocessor, integrated or not into the information processing device, and which may possibly be removable, is adapted to store one or more programs whose execution permits the implementation of the method according to the invention.

The executable code enabling the information processing device to implement the invention may equally well be stored in read only memory 43, on the hard disk 48 or on a removable digital medium such as an external disk 70 as described earlier. According to a variant, the executable code of the programs is received by the intermediary of the telecommunications network 80, via the interface 50, to be stored in one of the storage means of the device 40 (such as the hard disk 48) before being executed.

The central processing unit 42 controls and directs the execution of the instructions or portions of software code of the program or programs of the invention, the instructions or portions of software code being stored in one of the aforementioned storage means. On powering up of the device 40, the program or programs which are stored in a non-volatile memory, for example the hard disk 48 or the read only memory 43, are transferred into the random-access memory 44, which then contains the executable code of the program or programs of the invention, as well as registers for storing the variables and parameters necessary for implementation of the invention.

It will also be noted that the device implementing the invention or incorporating it may also be implemented in the form of a programmed apparatus. For example, such a device may then contain the code of the computer program(s) in a fixed form in an application specific integrated circuit (ASIC).

The device described here and, particularly, the central processing unit 42, may implement all or part of the processing operations described in relation to FIGS. 1 to 7, to implement the coding method of the present invention and constitute the coding device of the present invention.

The preceding examples are only embodiments of the invention which is not limited thereto.

In particular, although the second filters F' and G' of steps E110, E130 and E150 are inverse filters of the first filters F and G used in step E102, any independent filter may be used for the decoding, providing that the coder 2 knows it in order to correctly determine the suitable geometric orientation for best rendering. Alternatively, the coder may inform the decoder of the second filters used at steps E110 and E130, for example by sending the filter coefficients in a metadata field of the digital signal coding format, along with the orientation data structures.

The use of different filters for step E102 and the decoding is of particular interest, since a different decoding filter may provide a better reconstruction quality at similar rate. The invention makes it possible since the determination of the geometric orientation is independent from the filters used in step E102 of decomposition.

The invention claimed is:

1. A method of coding a multidimensional digital signal comprising a plurality of original samples to form a coded stream, the method comprising:
    filtering original samples by applying at least one first filter along a first geometric orientation, to obtain filtered samples;
    coding at least some of the filtered samples to obtain corresponding coded filtered samples, wherein the coded filtered samples are configured for decoding by a decoder into decoded filtered samples;
    applying a lossy modification of the filtered samples to obtain modified samples;

determining at least one second geometric orientation of one inverse filtering to be applied by the decoder to at least one decoded filtered sample, wherein said one second geometric orientation is different from said first geometric orientation, and is determined based on all of at least the modified samples, the original samples, and a predetermined criterion; and providing the determined second geometric orientations instead of the first geometric orientations to the decoder and providing the coded filtered samples to the decoder, so for the decoder to use the second geometric orientations for inverse filtering of the decoded filtered samples instead of using the first geometric orientation.

2. The method according to claim 1, wherein the applying step comprises simulating the quantization of the filtered samples and the dequantization of the filtered samples quantized to obtain the modified samples.

3. The method according to claim 1, wherein the applying step comprises decomposing the filtered samples into sub-bands, simulating the quantization and the dequantization of the filtered samples of all the sub-bands, and reconstructing the modified samples from the dequantized samples.

4. The method according to claim 1, wherein the step of coding the filtered samples comprises actual quantizing of the filtered samples,
wherein the applying step comprises simulating the dequantization of the actually quantized filtered samples.

5. The method according to any one of claims 1 to 4, wherein with respect to at least one modified sample, determining the at least one geometric orientation comprises:
simulating the filtering of the modified sample by applying the second filter thereto in a plurality of geometric orientations, the simulation resulting in a plurality of corresponding filtered modified samples; and
selecting one of the geometric orientations according to all of at least the predetermined criterion, the filtered modified samples, and the original samples.

6. The method according to claim 5, wherein the geometric orientation selected according to the predetermined criterion is the geometric orientation associated with the filtered modified sample that minimizes the distortion with respect to the original multidimensional signal.

7. The method according to claim 6, further comprising the filtering of modified samples, so as to obtain filtered modified samples corresponding to a multidimensional signal with higher resolution.

8. The method according to claim 7, wherein the filtering of the modified samples comprises retrieval, from the pluralities of filtered modified samples, of the filtered modified samples corresponding to the selected geometric orientations.

9. The method according to any one of claims 1 to 4, further comprising filtering of modified samples, so as to obtain filtered modified samples corresponding to a multidimensional signal with higher resolution.

10. The method according to any one of claims 1 to 4, wherein the determining at least one geometric orientation comprises:

calculating the value of a context function for each modified sample, the context function taking account of a predetermined number of other modified samples;
dividing the modified samples into sub-signals, each corresponding to the various values of the context function; and
associating a same geometric orientation of the second filter with the filtered samples corresponding to all the modified samples of a same sub-signal.

11. The method according to any one of claims 1 to 4, further comprising coding of information representing the determined geometric orientations to form part of the coded stream.

12. The method according to any one of claims 1 to 4, wherein said one first filter is applied with the same orientation for the filtering of each original sample.

13. The method according to any one of claims 1 to 4, wherein the filtering of an original sample comprises:
determining, according to at least one further predetermined criterion, the geometric orientation among a plurality of geometric orientations in the multidimensional digital signal; and
filtering the original sample by applying the at least one first filter with the determined geometric orientation.

14. The method according to any one of claims 1 to 4, wherein the steps of filtering, determining and providing are iterated so as to decompose the digital signal into sub-bands.

15. A non-transitory computer-readable storage medium readable by a computer system and on which is stored instructions for a computer program constructed to implement the method according to any one of claims 1 to 4 when the program is loaded and executed by the computer system.

16. A device for coding a multidimensional digital signal comprising a plurality of original samples to form a coded stream, the device comprising:
a filtering unit configured to filter along a first geometric orientation original samples by applying at least one first filter to obtain filtered samples;
a coding unit configured to code at least some of the filtered samples to obtain corresponding coded filtered samples, wherein the coded filtered samples are configured for decoding by a decoder into decoded filtered samples;
a modification unit configured to apply a lossy modification of the filtered samples to obtain modified samples;
a determination unit configured to determine at least one second geometric orientation of one inverse filtering to be applied by the decoder to at least one decoded filtered sample, wherein said one second geometric orientation is different from said first geometric orientation, and is determined based on all of at least the modified samples, the original samples, and a predetermined criterion; and
a providing unit configured to provide the determined second geometric orientations instead of the first geometric orientations to the decoder and providing the coded filtered samples to the decoder, so for the decoder to use the second geometric orientations for inverse filtering of the decoded filtered samples instead of using the first geometric orientation.

* * * * *